Figure 1:
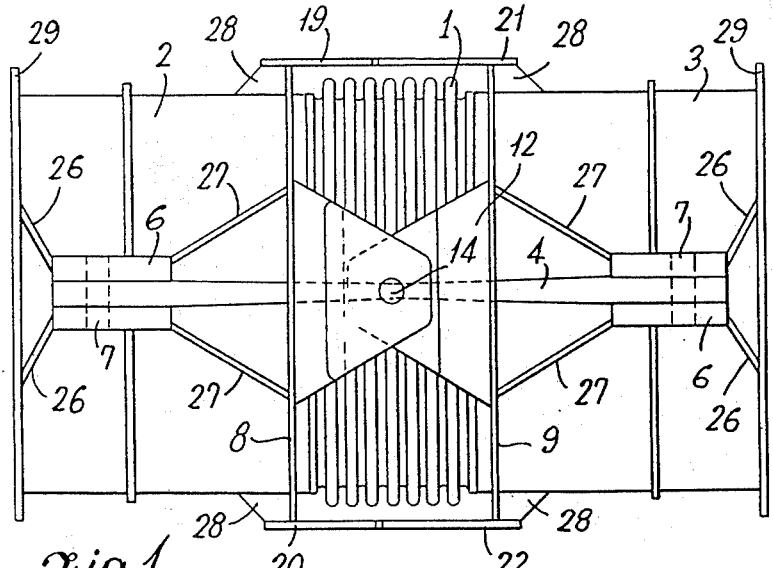

Dec. 4, 1962     T. E. ADAMS     3,066,960
COMPENSATORS FOR FLUID DUCTING
Filed Jan. 6, 1958     2 Sheets-Sheet 1

INVENTOR
THOMAS EDWARD ADAMS
ATTORNEY

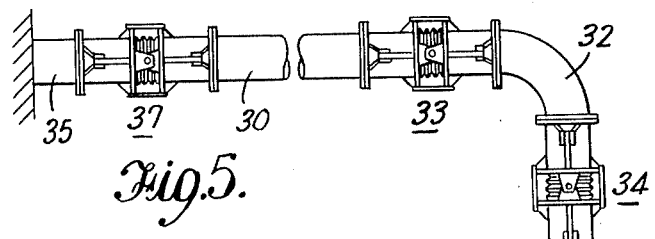
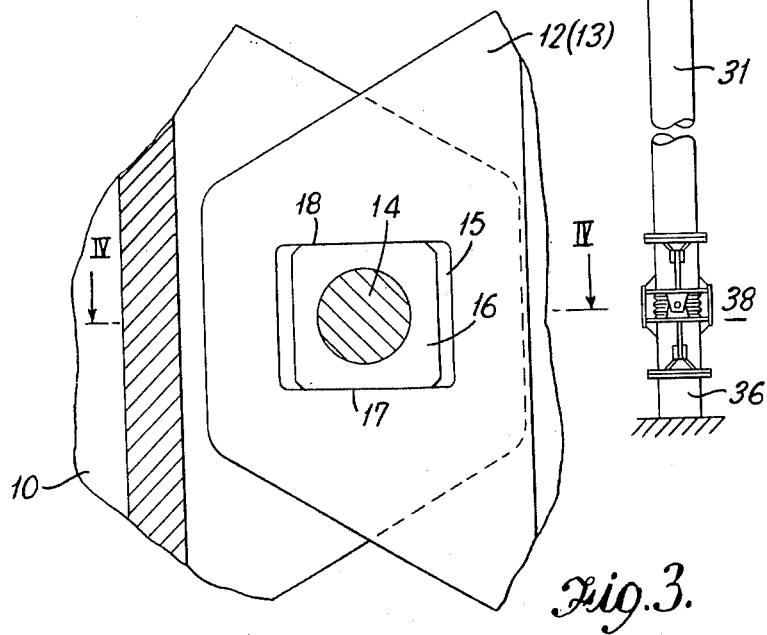
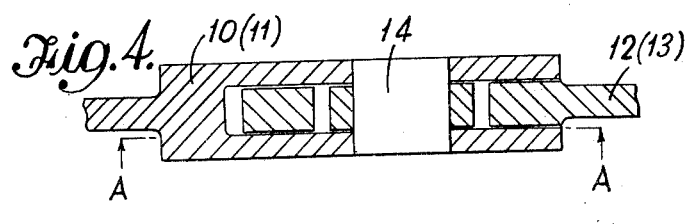

United States Patent Office 3,066,960
Patented Dec. 4, 1962

3,066,960
COMPENSATORS FOR FLUID DUCTING
Thomas Edward Adams, Rugby, England, assignor to Associated Electrical Industries (Rugby) Limited, a British company
Filed Jan. 6, 1958, Ser. No. 707,258
Claims priority, application Great Britain Mar. 28, 1957
1 Claim. (Cl. 285—114)

This invention relates to fluid ducting and particularly to arrangements employed in such ducting, and referred to as duct compensators, which allow angular movement between parts of the ducting located respectively on the two sides of the compensator whilst connecting said parts together in fluid-tight manner.

Duct compensators are commonly employed in order to allow the ducting to accommodate itself to changes in length of the ducting with change of temperature. For this purpose the ducting is arranged in a non-linear configuration so that changes in length of one or more parts thereof will cause angular movement between adjacent parts as may be necessary to allow for such changes in length, the angular movements necessary being permitted by one or more duct compensators. The duct compensator comprises a flexible element which provides a passage therethrough corresponding with the passage in the ducting as a whole and this flexible element is conveniently in the form of a bellows. Whilst the bellows will permit the necessary angular movement between the flow axes of two parts of the ducting which are connected together by the bellows, the latter is not adapted, as a result of the flexibility requisite therein for permitting such angular movement, to resist movement of the two parts of the ducting relatively to one another along the axis of the bellows or otherwise under the forces which will be produced on the two parts of the ducting by the pressure conditions therein. Thus, where the ducting provides a passage for pressure fluid the latter will tend to expand the bellows.

It has heretofore been a customary practice to provide a pivotal joint between the two parts of the ducting connected by a duct compensator, this pivotal joint positively constraining the two parts of the ducting so that relative movement therebetween is limited to the desired relative angular movement occurring about the axis of said pivotal joint, which thereby prevents relative movement of the two parts of the ducting by the fluid pressure forces acting thereon. The pivotal joint has comprised two pairs of hinge plates, the pairs being located respectively on opposite sides of the bellows and the hinge plates of each pair being rigidly secured respectively to the two parts of the ducting connected together by the bellows. The hinge plates of each pair have been connected together by a suitable hinge pin, the two hinge pins being located on a common axis corresponding with the desired relative angular movement of the two ducting parts.

The hinge arrangement just above indicated has been subject to the objection that the bearing loads imposed on the hinge plates and pins are so high as to cause deformation of the hinge bearing surfaces and it has not been possible to obtain or maintain a satisfactory bearing action.

It will be understood that although the flexible element is commonly in the form of a bellows, other forms may be employed, such as plain or annularly or otherwise corrugated diaphragms, and similar considerations to those above set forth will also apply with other forms of flexible element.

The impaired bearing action of the pivotal joints may interfere with the required angular movement so that objectionable or dangerous strains may be imposed on parts of the ducting or on the flexible element, with corresponding danger of fluid leakage.

The invention has for its object to provide an arrangement of duct compensator whereby the objections above set forth are overcome so that the compensator may operate satisfactorily over an extended life. The invention has important application in ducting for fluids in the thermal circuits of nuclear reactors, such as between the reactor core and a heat exchanger, although it is to be understood that the invention is not limited in this respect.

According to the present invention, a duct compensator comprises in combination with a flexible element providing a fluid-tight connection between two parts of the ducting, means, which may conveniently comprise one or more tension plates, or one or more tie bars, connected with the two parts of the ducting and providing between the latter a non-rigid connection preventing movement of said parts in the direction of the duct axis under the fluid pressure forces, and hinge means connected with the two parts of the ducting and constraining said parts against relative movement in a direction transverse to said axis whilst being relieved of forces in said first direction, for example by the provision of lost-motion in said direction between inter-connected hinge members forming said hinge means.

The tension plate or plates or tie bar or bars or other non-rigid connecting means may be arranged within the ducting and the flexible element or externally thereof as may be convenient. Whilst said means are made of sufficient strength to withstand the forces acting between the two parts of the ducting, namely separating forces in the case of ducting carrying a fluid at a pressure above the external pressure, said means may be arranged to flex in order to allow angular movement of the two ducting parts and may then be rigidly connected with the two parts of the ducting. The hinge means limit the angular movement to an axis which remains always in one plane relative to the two parts of the ducting.

The hinge means according to the present invention are also preferably arranged to provide constraint of the two ducting parts against relative movement thereof along the axis of said angular movement and about the duct axis. For this purpose the hinge means may include suitable abutment members carried respectively by the two parts of the ducting and co-operating with one another to resist movement along the hinge axis and about the duct axis, whilst permitting relative movement therebetween about the hinge axis.

According to another feature of the invention, the hinge means comprise a member having pivotal connection and slidable connection, respectively, with two hinge members connected respectively with the two ducting parts, said slidable connection providing an operating clearance with respect to one of said parts in the direction of the duct axis. Conveniently, an abutment block or other member having pivotal connection with one of the hinge members includes linear abutment surfaces slidably co-operating with corresponding linear abutment surfaces on the other hinge member so as to provide constraint between the last-mentioned member and said abutment member in a direction transverse to the duct axis, but permitting relative movement between said members in the direction of said axis.

Figure 2:
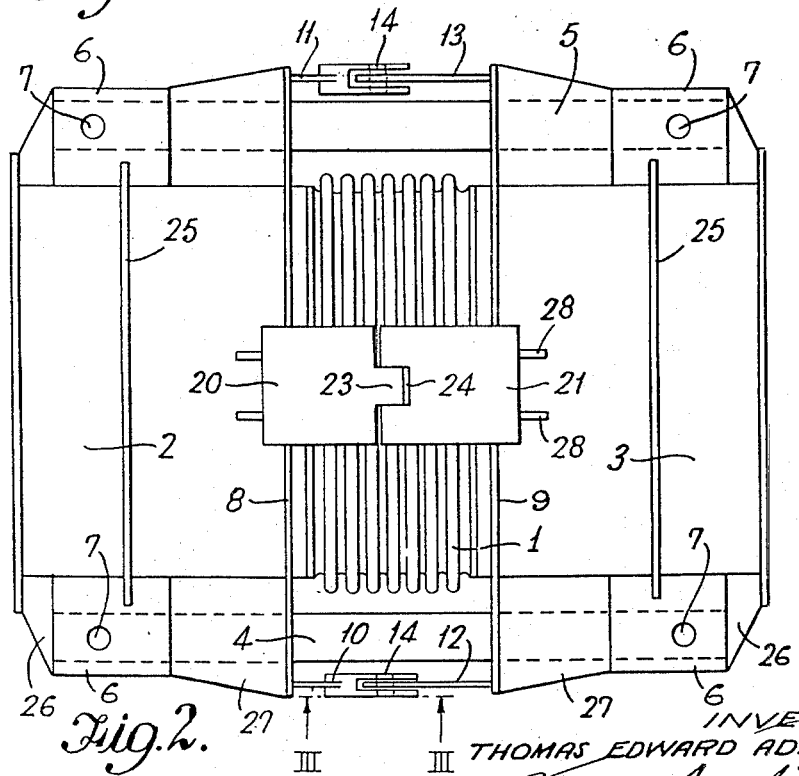

Reference will now be made by way of example to the accompanying drawings, in which:

FIGS. 1 and 2 are, respectively, a side elevation and a plan of one embodiment of the invention, FIG. 3 is a fragmentary sectional elevation taken on the line III—III of FIG. 2 showing a detail of the hinge joint, FIG. 4 is a fragmentary sectional plan taken on the line IV—IV of FIG. 3, and FIG. 5 is an outline drawing illustrating a typical application of duct compensators.

Referring to FIGS. 1 and 2, the compensator shown therein comprises a generally cylindrical metal bellows 1 connected at its end, such as by welding, with the opposing ends of two circular ducting parts 2 and 3 which are axially aligned with one another and with the bellows.

A pair of horizontal tie bars 4 and 5 are located one on each side of the duct, each extending between suitable lugs 6 secured, such as by welding, to the two ducting parts 2 and 3. The ends of the tie bars are received in longitudinal slots formed in the lugs 6 and are connected with the latter by vertical pin joints 7. As can be seen the tie bars are located in a horizontal diametral plane of the duct. The desired hinging axis of the two duct parts is located in said plane, and as will be understood is perpendicular to the longitudinal axis of the duct.

The ends of the two ducting parts adjacent the bellows are surrounded respectively by annular plates 8 and 9 having inner edges corresponding with the cross section of the duct axis at which said plates are welded or otherwise secured to the external surface of the parts 2 and 3. The outer peripheral edges of the plates 8 and 9 are of octagonal form providing a plurality of straight edges located as will hereinafter appear. The plates extend outwardly beyond the tie bars 4 and 5 and are provided with suitable apertures through which said tie bars extend with substantial clearance. On the two sides of the duct there are arranged pairs of hinge plates comprising plates 10 and 11 welded or otherwise secured to the annular plate 8, and plates 12 and 13 welded or otherwise secured to the annular plate 9. The several hinge plates are each of generally triangular or trapezoidal form as can be seen and have their major surfaces disposed in planes perpendicular to the desired hinging axis of the compensator. The plates 10 and 11 are of bifurcated construction as most clearly seen in FIG. 4 and receive in their bifurcated ends the adjacent ends of the hinge plates 12 and 13, respectively. The bifurcated ends of the plates 10 and 11 are provided with circular openings which are co-axial with the desired hinge axis of the compensator and receive journal pins fixed in said openings. The hinge plates 12 and 13 are each provided with a rectangular opening 15 (FIG. 3) in which is accommodated an abutment block 16 having a circular opening which is a journal fit on the associated pin 14. The opening 15 has a length greater than that of the block 16, but the upper and lower linear surfaces of the block are a close sliding fit with regard to the upper and lower linear surfaces 17 and 18 of the opening.

With the construction above described axial separating forces between the ducting parts 2 and 3 will be resisted by the tie bars 4 and 5, but the latter will allow, by flexure thereof, angular movement of the two ducting parts about that diametral axis of the bellows 1 which intersects the tie bars 4 and 5, that is to say about the desired hinging axis. The hinge pins 14 are located on this axis.

It will be seen that the hinge plate construction offers no restraint against said separating forces, since there is lost-motion axially of the compensator between each abutment block 16 and the associated plate 12 or 13. Each of said blocks, however, being in close engagement with the surfaces 17 and 18 (FIG. 3) prevents relative movement in the vertical direction of the hinge plates 10 and 12, or 11 and 13, of each pair so that said plates are constrained for relative movement about the axis of the journal pins 14 which is the diametral axis of the bellows about which hinging of the compensator is desired.

In order to relieve the journal pins of forces resulting from any tendency to relative angular movement of the ducting parts about the longitudinal axis of the duct, and also to resist any lateral movement of the two ducting parts relatively to one another along the hinging axis, further abutment means are provided. These abutment means comprise plates 19 and 20 secured, such as by welding, to straight edges of the annular plate 8, and plates 21 and 22 similarly secured to straight edges of the annular plate 9. As can be seen, each pair of plates 19, 21, and 20, 22 extends across the bellows with the two plates of each pair in the same plane as one another. The plates 19 and 20 are each provided with a parallel sided tooth 23 (FIG. 2) received in a corresponding recess 24 in the plate 21 or 22, as the case may be. The recesses and teeth have close sliding engagement with one another, but clearance is provided between the plates in the axial direction of the duct, as can clearly be seen from FIG. 2. By this means free angular movement of the two ducting parts 2 and 3 about the hinge axis is permitted, but the plates 19 to 22 prevent any relative rotational movement of the two ducting parts about the longitudinal axis of the duct and also provide constraint against transverse movement of the two ducting parts relative to one another along the hinge axis.

The tie bars 4 and 5 may be provided with a cross section which reduces from the lugs 6 to the centre of the tie bars, as is clearly shown in FIG. 1. Reinforcing hoops 25 and gusset plates 26, 27 and 28 may be provided, being welded to the ducting parts 2 and 3, lugs 6, annular plates 8 and 9, and hinge plates 19 to 22, and also to connecting flanges 29 on the ends of the ducting parts 2 and 3.

It will be understood that duct compensators according to the invention may be arranged in any appropriate location in a duct. FIG. 5 illustrates the application of duct compensators of the form described with reference to FIGS. 1 to 4 in a common arrangement of duct, said arrangement comprising two linear parts 30 and 31 which are disposed substantially perpendicularly to one another with their adjacent ends connected together by a rigid elbow 32 between which and said parts 30 and 31 duct compensators 33 and 34 are provided. The other ends of the parts 30 and 31 are connected with fixed parts 35 and 36 of the fluid circuit, by means of further duct compensators 37 and 38. On expansion or contraction of the parts 30 and 31, such as due to temperature changes, the duct compensators permit angular movement of the two ducting parts about the axis of the ducts 37 and 38 with corresponding movement of the rigid elbow piece 32, the latter suffering angular displacement with respect to the parts 30 and 31 about the hinge axes of the compensators 33 and 34.

The tie bars 4 and 5 are given a cross section appropriate to the separating forces acting between the two ducting parts 2 and 3; since the depth of these bars is desirably kept small in the interests of flexibility thereof, the width of the bars may be relatively large in some cases, that is to say the bars may assume a plate form.

The tie bars or plates may be arranged within the bellows 1 and ducting parts 2 and 3 instead of externally thereof, as shown in FIGS. 1 and 2. For example a single plate may be arranged in a diametral plane of the duct, extending longitudinally of the latter, the parallel edges of said plate at the ends thereof being welded to the internal surface of the parts 2 and 3. In another arrangement a single tie bar located in the longitudinal axis of the duct is connected at its ends with spider members secured, as by welding, to the two parts 2 and 3, respectively.

What I claim is:

A duct compensating arrangement comprising two normally axially aligned parts of a ducting, a flexible element providing a fluid tight connection between said two parts of the ducting, two pairs of interconnected hinge members connected with said ducting parts to permit hinging movement of said ducting parts about a common hinging axis, a first hinge member of each of said pairs including linear abutment surfaces extending substantially longitudinally of the ducting, two abutment blocks having linear abutment surfaces slidably cooperating with the abutment surfaces on the respective first hinge members, a second hinge member of each pair, means pivotally connecting said second hinge member to respective ones of said abutment blocks, cooperating abutment means extending between the ends of the ducting parts and having cooperating end surfaces of tooth and slot form, said tooth surfaces having a close longitudinally sliding fit with said slot surfaces, axial load taking means extending between said two parts of the ducting, said axial load taking means intersecting the hinge axis and being shaped so as to bend at the hinge axis and also shaped to resist movement perpendicular to the hinge axis, said axial load taking means having means connecting the ends of said axial load taking means rigidly to said parts of the ducting so as to resist movement perpendicular to the hinge axis.

References Cited in the file of this patent

UNITED STATES PATENTS

| | | |
|---|---|---|
| 912,923 | Vauclain | Feb. 16, 1909 |
| 1,499,050 | Broome | June 24, 1924 |
| 1,726,483 | Giesler | Aug. 27, 1929 |
| 2,196,676 | Johnson | Apr. 9, 1940 |
| 2,707,117 | Fentress | Apr. 26, 1955 |

FOREIGN PATENTS

| | | |
|---|---|---|
| 209,839 | Great Britain | Jan. 21, 1924 |
| 629,161 | Germany | Apr. 23, 1936 |
| 137,602 | Great Britain | June 13, 1950 |